3,239,528
N-PHENETHYL PIPERAZINE AND HOMO-
PIPERAZINE DERIVATIVES
Walter von Bebenburg, Frankfurt am Main, and Ansgar
von Schlichtegroll, Bad Homburg vor der Hohe, Germany, assignors to Deutsche Gold- und Silber-Scheideanstalt vormals Roessler, Frankfurt am Main, Germany
No Drawing. Filed Aug. 8, 1963, Ser. No. 300,937
Claims priority, application Germany, Aug. 9, 1962,
D 39,584
2 Claims. (Cl. 260—268)

The present invention relates to novel compounds which can be used as therapeutic agents for influencing the central nervous system, for example, as sedatives or hypnotics, which are of the formula

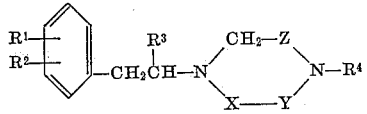

and their equivalent salts. In such formula each of $R^1$ and $R^2$ are hydrogen, halogen, lower alkyl groups or lower alkoxy groups, $R^3$ is a lower alkyl group, each of X, Y and Z are methylene, ethylene, ethylidene or carbonyl radicals, $R^4$ is hydrogen, aryl, lower alkenyl, lower alkoxy aryl, halogen aryl, lower dialkyl amino aryl, carbethoxy aryl, acyl (lower alkanoic acid acyl), carbamido, acyl carbamido, aryl carbamido or acyl carbureido, and when Z and Y are carbonyl $R^4$ cannot be acyl or carbamido.

According to U.S. patent 2,858,312, compounds of the formula

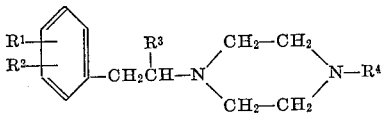

in which $R^1$ and $R^2$ are alkoxy or hydroxy, $R^3$ is lower alkyl and $R^4$ is lower alkyl, furfuryl or cyclohexyl are indicated to be useful as blood pressure reducing agents.

The compounds according to the invention can be produced by effecting a reductive condensation of compounds of the formula

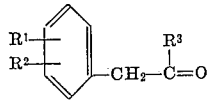

with a compound of the formula

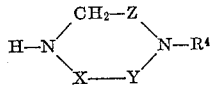

or its salts wherein X is methylene, ethylene or ethylidene and Y and Z are the same or a carbonyl group.

They also can be produced by reacting a compound of the formula

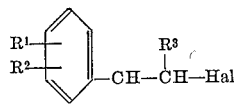

in which Hal is Cl or Br with a compound of the formula

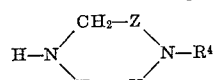

or its salts to split off HCl or HBr, preferably, in the presence of a basic acid acceptor and at raised temperatures in the presence of an inert solvent.

It is also possible to start from a compound of the formula

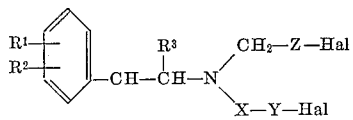

wherein Hal is Cl or Br or its salt and react it with an amine of the formula

to split off HCl or HBr, preferably, under the conditions outlined above.

Similarly, the compounds according to the invention can be prepared by reacting a compound of the formula

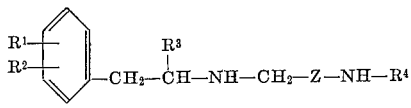

or its salt with a compound of the formula $$Hal—X—Y—Hal$$

or by reacting a compound of the formula

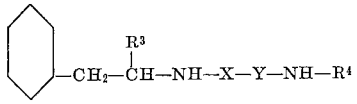

or its salt with a compound of the formula $$Hal—CH_2—Z—Hal$$

Still another manner of preparing the compounds according to the invention is to start from a compound of the formula

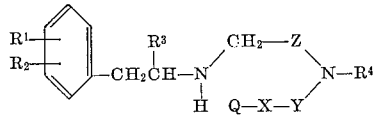

wherein Q is OH or halogen or its salt and effect ring closure with splitting off of water or hydrogen halide in a known manner.

Finally, it is also possible to introduce the group $R^4$ into a compound of the formula

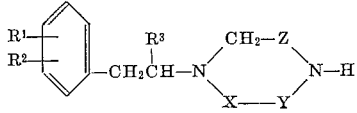

in place of the hydrogen atom on the nitrogen atom of the heterocyclic ring in a known manner.

Of course, the compounds according to the invention produced insofar as they are recovered in the form of the free base can be converted to their salts with acids having pharmaceutically acceptable anions, such as are well known to the art.

It was also found that the racemates obtained can be reacted with an optically active acid and to recover the optically active isomers by fractional precipitation or crystallization. The optically active isomers can also be obtained by employing optically active starting materials.

The following examples will serve to illustrate the invention with reference to several representative embodiments thereof.

EXAMPLE 1

N-[1-phenylpropyl-(2)]-piperazine

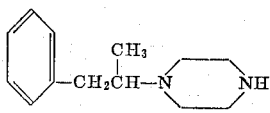

A solution of 536 g. (4 mol) of phenyl acetone and 690 g. (8 mol) of piperazine in 3 liters of ethanol, after addition of 100 g. of Raney nickel, was shaken for 8 hours at 100° C. under hydrogen at 50 atmospheres gauge pressure. After filtration the solution was boiled down and the residue fractionally distilled under vacuum. The N-[1-phenylpropyl-(2)]-piperazine distilled over at 108–125° C. at a pressure of 0.5 torr. It was rectified once more. Yield: 310 g., boiling point at 0.5 torr 115–125° C., melting point of the hydrochloride 275–275° C.

EXAMPLE 2

N-[p-methoxyphenylpropyl-(2)]-piperazine

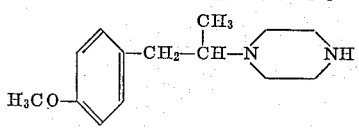

A solution of 49 g. (0.3 mol) of p-methoxy-phenylacetone and 78 g. (0.9 mol) of piperazine in 300 cc. of methanol, after addition of 20 g. of Raney nickel, was hydrogenated and processed as in Example 1. Yield: 28 g., boiling point: 138–139° C. at 0.04 torr.

EXAMPLE 3

N-[1-phenylpropyl-(2)]-homopiperazine

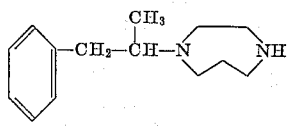

A solution of 54 g. (0.4 mol) of phenyl acetone and 200 g. (2 mol) of homopiperazine in 400 cc. of ethanol, after addition of 20 g. of Raney nickel, was hydrogenated and processed as in Example 1. Yield: 17 g., boiling point: 115–120° C. at 0.05 torr.

EXAMPLE 4

4-[1-phenylpropyl-(2)]-2-ketopiperazine

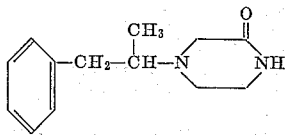

A solution of 74 g. (0.55 mol) of phenyl acetone and 80 g. (0.80 mol) of 2-ketopiperazine in 400 cc. of ethanol, after addition of 15 g. of Raney nickel, was hydrogenated as above. The filtered solution was distilled under vacuum and the fraction of the crude 4-[1-phenylpropyl-(2)]-2-ketopiperazine distilled over at 170–190° C. at 0.5 torr. This fraction was taken up in water, shaken out several times with ether and the aqueous layer boiled down. The solid residue was fractionally crystallized from isopropanol/ether to separate off the less soluble 2-ketopiperazine and then recrystallized again from benzene/gasoline.

Yield: 37 g., melting point: 83–87° C.

EXAMPLE 5

N-[1-phenylpropyl-(2)]-N'-o-ethylphenylpiperazine

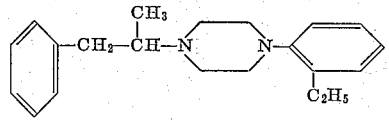

A solution of 41.5 g. (0.31 mol) of phenyl acetone and 47.5 g. (0.25 mol) of N-o-ethylphenylpiperazine in 400 cc. of ethanol, after addition of 15 g. of Raney nickel, was hydrogenated and processed as in Example 1.

Yield: 18.5 g., boiling point: 165–175° C. at 4 torr, melting point of hydrochloride: 250–253° C.

EXAMPLE 6

N-[1-phenylpropyl-(2)]-N'-p-chlorophenylpiperazine

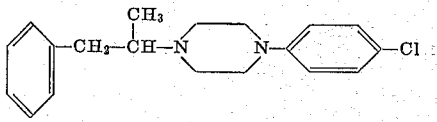

A solution of 67 g. (0.5 mol) of phenyl acetone and 78 g. (0.4 mol) of N-p-chlorophenylpiperazine in 300 cc. of ethanol was hydrogenated as in Example 1. The reaction product was crystallized from the hot filtered reaction solution and recrystallized from ethanol.

Yield: 72 g., melting point: 90–92° C., melting point of hydrochloride: 212–214° C.

EXAMPLE 7

N-[1-phenylpropyl-(2)]-N'-p-diethylaminophenylpiperazine

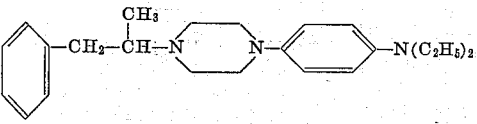

A solution of 30.6 g. (0.1 mol) of N,N-bis-(β-chloroethyl)-1-phenylpropylamine-(2)-hydrochloride and 23.5 g. (0.3 mol) of p-N,N-diethylaminoaniline hydrochloride in 100 cc. of ehanol to which 30.4 g. (0.2 mol) of $K_2CO_3$ had been added was refluxed for 1 hour while stirring. Thereafter, a further 41.5 g. (0.3 mol) of $K_2CO_3$ were added and the mixture refluxed for a further 16 hours while stirring. The solution was filtered and boiled down. The residue was fractionally distilled under vacuum.

Yield: 14.8 g., boiling point at 0.1 torr: 215–225° C., melting point of hydrochldride: 237–238° C.

EXAMPLE 8

N-[1-phenylpropyl-(2)]-N'-o-methoxyphenyl piperazine

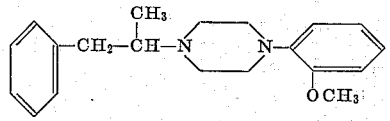

A solution of 30.6 g. (0.1 mol) of N,N-bis-(β-chloroethyl)-1-phenylpropylamine-(2)-hydrochloride and 12.3 g. (0.1 mol) of o-anisidine in 100 cc. of ethanol, to which 41.5 g. (0.3 mol) of $K_2CO_3$ had been added, was refluxed for 16 hours and the reaction mixture processed as in Example 7.

Yield: 15.7 g., boiling point at 0.05 torr: 170–180° C., melting point of hydrochloride: 232–234° C.

EXAMPLE 9

N-[1-phenylpropyl-(2)]-N'-carbureido piperazine

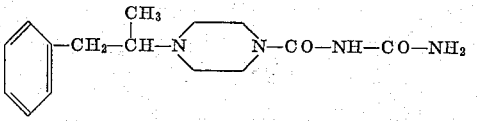

22 g. (0.16 mol) of ω-nitrobiuret were added in portions to a solutio nof 29 g. (0.14 mol) of N-[1-phenylpropyl-(2)-piperazine (Example 1) in 100 cc. of a 50% methanol/water mixture at 50° C. The solution, which originally was clear and from which lively $N_2O$ evolution took place was gradually heated to 80° C. After gas evolution ceased the reaction solution was permitted to cool down. The crystals which precipitated were filtered off and recrystallized from methanol.

Yield: 20 g., melting point 138–142° C.

EXAMPLE 10

*N1[1-p-methoxyphenylpropyl-(2)]-N'-carbureido piperazine*

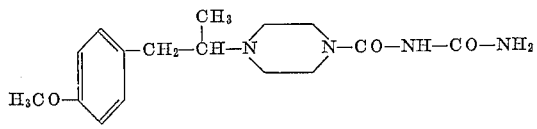

9.5 g. (0.064 mol) of ω-nitrobiruet was reacted with a solution of 15 g. (0.064 mol) of N-[1-p-methoxyphenyl-propyl-(2)]-piperazine in 75 cc. of a 50% methanol/water mixture as in Example 9.

Yield: 11 g., melting point: 173–175° C.

EXAMPLE 11

*N-[1-phenylpropyl-(2)]-N'-carbureido piperazine*

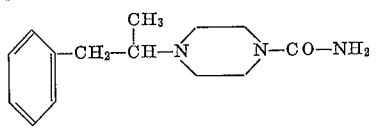

45 cc. of glacial acetic acid were added to a solution of 102 g. (0.5 mol) of N-[1-phenylpropyl-(2)]-piperazine and 61 g. (0.75 mol) of potassium cyanate in 300 cc. of water and the mixture heated slowly to 60° C. After 8 hours the reaction mixture was permitted to cool and the precipitated crystals of the carbamido compound filtered off and recrystallized from acetone.

Yield: 103 g., melting point: 117–120° C.

EXAMPLE 12

*1-[1-phenylpropyl-(2)]-piperazino-4-(N-3,4,5-trimethoxybenzoyl)-carbamide*

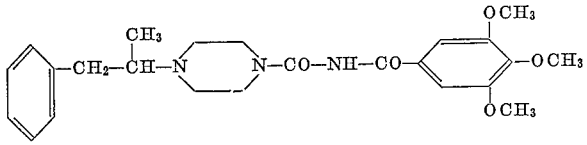

19 g. (0.075 mol) of N-[1-phenylpropyl-(2)-N'-carbamido-piperazine were suspended in 100 cc. of toluene and a solution of 18 g. (0.078 mol) of 3,4,5-trimethoxybenzoyl chloride in 50 cc. of toluene added thereto dropwise. The mixture was then refluxed for 2 hours while stirring. The reaction product, 1-[1-phenylpropyl-(2)]-piperazino-4-(N-3.4.5 - trimethoxybenzoyl)-carbamide, was filtered off on a suction filter and recrystallized from methanol.

Yield: 15 g., melting point of the hydrochloride: 225–227° C.

EXAMPLE 13

*N-[1-phenylpropyl-(2)]-piperazinecarboanilide*

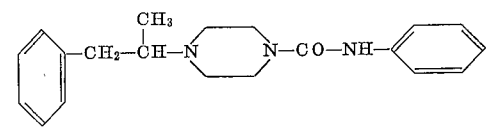

8.9 g. (0.75 mol) of phenyl isocyanate in 30 cc. of absolute ether were added slowly to 15 g. (0.075 mol) of N-[1phenylpropyl-(2)]-piperazine (Example 1) in absolute ether and after the reaction subsided the mixture stirred for a further 2 hours at room temperature. The crystals which separated out were filtered off and recrystallized from ethanol/water.

Yield: 18 g., melting point: 140–142° C.

We claim:
1. A compound of the formula

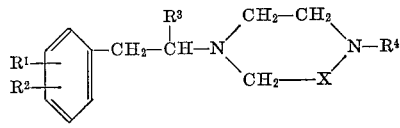

wherein each of $R^1$ and $R^2$ is selected from the group consisting of hydrogen, halogen, lower alkyl, lower alkoxy, $R^3$ is lower alkyl, X is selected from the group consisting of methylene, ethylene and carbonyl and $R^4$ is selected from the group consisting of acyl, carbamido, acyl, carbamido, phenyl carbamido, carbureido and acyl carbureido, wherein acyl is selected from the group consisting of lower alkanoic acyl, benzoyl, alkoxy substituted benzoyl and halogen substituted benzoyl.

2. A compound of the formula

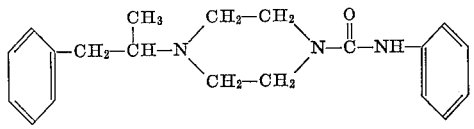

References Cited by the Examiner
UNITED STATES PATENTS

| | | | |
|---|---|---|---|
| 2,858,312 | 10/1958 | Olin | 260—268 |
| 2,858,313 | 10/1958 | Olin | 260—268 |
| 2,927,924 | 3/1960 | Mills | 260—268 |
| 3,037,024 | 5/1962 | Parcell | 260—268 |
| 3,062,821 | 11/1962 | Archer | 260—268 |
| 3,072,658 | 1/1963 | Fancher et al. | 260—268 |
| 3,170,926 | 2/1965 | Fenton et al. | 260—268 |

NICHOLAS S. RIZZO, *Primary Examiner.*

JAMES W. ADAMS, *Assistant Examiner.*